United States Patent
Miyamoto et al.

(10) Patent No.: US 10,851,998 B2
(45) Date of Patent: Dec. 1, 2020

(54) GAS TURBINE COMBUSTOR FLAME HOLDER

(71) Applicant: MITSUBISHI HEAVY INDUSTRIES, LTD., Tokyo (JP)

(72) Inventors: Kenji Miyamoto, Tokyo (JP); Satoshi Takiguchi, Tokyo (JP); Keijiro Saito, Tokyo (JP); Shinji Akamatsu, Yokohama (JP); Shinichi Fukuba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 144 days.

(21) Appl. No.: 16/087,882

(22) PCT Filed: Mar. 28, 2017

(86) PCT No.: PCT/JP2017/012538
§ 371 (c)(1),
(2) Date: Sep. 24, 2018

(87) PCT Pub. No.: WO2017/170485
PCT Pub. Date: Oct. 5, 2017

(65) Prior Publication Data
US 2019/0107283 A1    Apr. 11, 2019

(30) Foreign Application Priority Data
Mar. 29, 2016    (JP) .................................. 2016-065010

(51) Int. Cl.
*F23R 3/18*    (2006.01)
*F23R 3/34*    (2006.01)
(Continued)

(52) U.S. Cl.
CPC .................. *F23R 3/18* (2013.01); *F02C 3/04* (2013.01); *F23R 3/10* (2013.01); *F23R 3/28* (2013.01);
(Continued)

(58) Field of Classification Search
CPC .. F23R 3/286; F23R 3/18; F23R 3/343; F23R 3/22
See application file for complete search history.

(56) References Cited

U.S. PATENT DOCUMENTS

2017/0122563 A1    5/2017    Tanaka et al.

FOREIGN PATENT DOCUMENTS

| JP | 5-141657 | 6/1993 |
| JP | 11-344224 | 12/1999 |

(Continued)

OTHER PUBLICATIONS

International Search Report dated May 16, 2017 in corresponding International Application No. PCT/JP2017/012538.
(Continued)

*Primary Examiner* — Todd E Manahan
*Assistant Examiner* — Katheryn A Malatek
(74) *Attorney, Agent, or Firm* — Wenderoth, Lind & Ponack, L.L.P.

(57) ABSTRACT

A combustor includes: a first nozzle which extends along an axis and injects fuel toward a downstream side; a flame stabilizer which covers a downstream-side end portion of the first nozzle from an outer periphery side; and a plurality of second nozzles arranged at intervals in a circumferential direction around the axis on the outer periphery side of the flame stabilizer. The flame stabilizer has a cone portion expanding in diameter toward the downstream side from the upstream side, and a flange portion extending radially outward from a downstream-side end edge of the cone portion,
(Continued)

and a penetrating portion which penetrates at least the flange portion in a direction of the axis is formed in the flame stabilizer.

6 Claims, 6 Drawing Sheets

(51) Int. Cl.
    *F23R 3/30*     (2006.01)
    *F23R 3/28*     (2006.01)
    *F02C 3/04*     (2006.01)
    *F23R 3/10*     (2006.01)

(52) U.S. Cl.
    CPC ................ *F23R 3/286* (2013.01); *F23R 3/30* (2013.01); *F23R 3/34* (2013.01)

(56) References Cited

FOREIGN PATENT DOCUMENTS

| | | |
|---|---|---|
| JP | 2003-130351 | 5/2003 |
| JP | 2004-101071 | 4/2004 |
| JP | 2005-114193 | 4/2005 |
| JP | 2013-190196 | 9/2013 |
| WO | 2015/178149 | 11/2015 |

OTHER PUBLICATIONS

Written Opinion of the International Searching Authority dated May 16, 2017 in corresponding International Application No. PCT/JP2017/012538.

GAS TURBINE COMBUSTOR FLAME HOLDER

TECHNICAL FIELD

The present invention relates to a combustor and a gas turbine.

Priority is claimed on Japanese Patent Application No. 2016-065010, filed on Mar. 29, 2016, the content of which is incorporated herein by reference.

BACKGROUND ART

A combustor which is used in a gas turbine includes a first fuel nozzle for forming diffusion flame or premixed flame, and a second fuel nozzle for forming premixed flame through ignition by the above flame. A downstream-side end portion of the first fuel nozzle is generally covered with a flame stabilizer for stabilizing the premixed flame formed by the second fuel nozzle (refer to PTL 1 below). The flame stabilizer described in PTL 1 has a cone shape that expands in diameter toward the downstream side from the upstream side.

CITATION LIST

Patent Literature

[PTL 1] Japanese Unexamined Patent Application, First Publication No. H11-344224

SUMMARY OF INVENTION

Technical Problem

However, by providing the flame stabilizer as described above, the flame stabilizer is able to realize flame stabilizing on the premixed flame, whereas the flame stabilizer itself is exposed to the flame, so that there is a case where thermal deformation occurs in the flame stabilizer. In a case where the flame stabilizer is deformed, the shape of the premixed flame which is formed on the downstream side of the flame stabilizer or the property of a combustion gas is affected, so that there is a case where the stable operation of the combustor may be hindered.

The present invention has been made to solve the above problem and has an object to provide a combustor which can stably operate even in a case where thermal deformation occurs in a flame stabilizer, and a gas turbine provided with the combustor.

Solution to Problem

According to a first aspect of the present invention, there is provided a combustor including: a first nozzle which extends along an axis and injects fuel toward a downstream side; a flame stabilizer which covers a downstream-side end portion of the first nozzle from an outer periphery side; and a plurality of second nozzles arranged at intervals in a circumferential direction around the axis on the outer periphery side of the flame stabilizer, in which the flame stabilizer has a cone portion expanding in diameter toward the downstream side from the upstream side, and a flange portion extending radially outward from a downstream-side end edge of the cone portion, and a penetrating portion which penetrates the flange portion in an axial direction is formed in at least the flange portion.

According to this configuration, the penetrating portion is formed in at least the flange portion, and therefore, even in a case where the flame stabilizer is exposed to the heat of the flame, the penetrating portion absorbs thermal stress in a peripheral portion of the penetrating portion, whereby it is possible to suppress thermal deformation. That is, it is possible to reduce a possibility that the influence of the thermal deformation may reach portions other than the flange portion.

According to a second aspect of the present invention, in the combustor according to the first aspect, the penetrating portion may include a flange-portion slit extending toward the inside from the outside in the radial direction of the flange portion, and a cone-portion slit communicating with the flange-portion slit and formed in an area which includes a downstream-side end portion of the cone portion.

In this configuration, the flange-portion slit is formed in the flange portion, and in addition, the cone-portion slit communicating with the flange-portion slit is formed in the cone portion. In this way, in a case where the flame stabilizer is exposed to heat, thermal deformation is absorbed by the flange-portion slit, and the thermal stress is absorbed by the cone-portion slit as well. In this way, it is possible to reduce thermal deformation that occurs in a connection portion between the flange portion and the cone portion (an end edge on the outside in the radial direction of the cone portion). That is, the durability of the flame stabilizer can be improved.

According to a third aspect of the present invention, in the combustor according to the first or second aspect, the penetrating portion may be a hole which penetrates the flange portion in the axial direction.

According to this configuration, the hole as the penetrating portion is formed in the flange portion, and therefore, even in a case where the flame stabilizer is exposed to the heat of the flame, thermal stress can be absorbed by the hole. That is, it is possible to reduce a possibility that the influence of the thermal stress may reach the cone portion.

According to a fourth aspect of the present invention, in the combustor according to the first or second aspect, a plurality of the penetrating portions may be formed at intervals in the circumferential direction around the axis in at least the flange portion.

In this configuration, the plurality of penetrating portions are formed at intervals in the circumferential direction around the axis. In this way, even in a case where the flame stabilizer is exposed to heat, thermal stress can be uniformly absorbed in the circumferential direction. In other words, it is possible to reduce a possibility that the flame stabilizer may be unevenly deformed in the circumferential direction.

According to a fifth aspect of the present invention, in the combustor according to any one of the first to fourth aspects, the combustor may further include a plurality of extension tubes each provided on the downstream side of each of the second nozzles and having a tubular shape extending in the axial direction, the plurality of extension tubes being arranged at intervals in the circumferential direction around the axis, in which a position in the circumferential direction where the penetrating portion is provided on the flange portion may be between a pair of extension tubes adjacent to each other.

The flame formed on the downstream side of the second nozzle extends toward the downstream side within each of the extension tubes. On the other hand, air guided from the outside of the combustor flows toward the downstream side from the upstream side of the flame stabilizer. In a case where the position in the circumferential direction of the penetrating portion formed in the flame stabilizer overlaps the position in the circumferential direction of each extension tube, the composition of an air-fuel mixture which is supplied to the flame changes, so that there is a possibility that combustibility may be affected. However, in the above configuration, the position in the circumferential direction of the penetrating portion is between the extension tubes. In other words, the penetrating portion is formed at a position different from each extension tube in the circumferential direction. Further, air flows from the upstream side into the space between the extension tubes. In this way, it is possible to reduce a possibility that air which has passed through the penetrating portion may collide with the flame.

According to a sixth aspect of the present invention, in the combustor according to any one of the first to fifth aspects, the combustor may further include an adjustment plate which covers the penetrating portion from the downstream side, in which an adjusting penetration portion having an opening area smaller than an opening area of the penetrating portion and communicating with the penetrating portion may be formed in the adjustment plate.

In this configuration, the penetrating portion is covered from the downstream side with the adjustment plate in which the adjusting penetration portion is formed. In this way, thermal stress can be released by the penetrating portion, and in addition, the amount of air passing through the penetrating portion can be adjusted by the adjusting penetration portion of the adjustment plate.

According to a seventh aspect of the present invention, there is provided a gas turbine including: a compressor which generates high-pressure air; the combustor according to any one of the first to sixth aspects, which generates a combustion gas by mixing the high-pressure air and fuel and burning the mixture; and a turbine which is driven by the combustion gas.

According to this configuration, it is possible to provide a gas turbine that can operate stably.

Advantageous Effects of Invention

According to the present invention, it is possible to provide a combustor which can stably operate even in a case where thermal deformation occurs in a flame stabilizer, and a gas turbine provided with the combustor.

DESCRIPTION OF EMBODIMENTS

Figure 1:
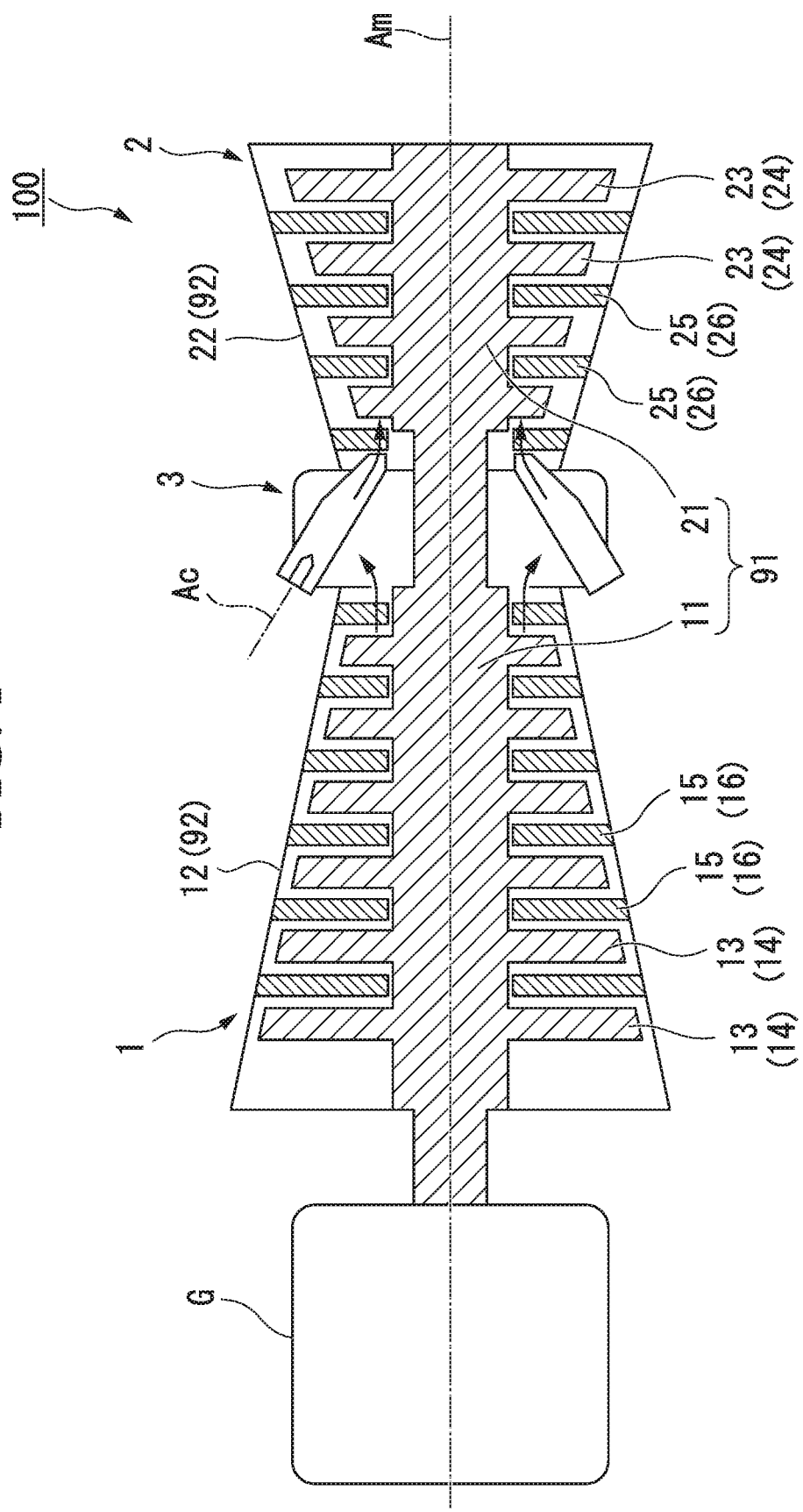
FIG. 1 is a schematic diagram showing a configuration of a gas turbine according to an embodiment of the present invention.

An embodiment of the present invention will be described with reference to FIGS. 1 to 5. As shown in FIG. 1, a gas turbine 100 according to this embodiment includes a compressor 1 which generates high-pressure air, a combustor 3 which generates combustion gas by mixing fuel with the high-pressure air and burning the mixture, and a turbine 2 which is driven by the combustion gas.

The compressor 1 has a compressor rotor 11 which rotates around a main axis Am, and a compressor casing 12 which covers the compressor rotor 11 from the outer periphery side. The compressor rotor 11 has a columnar shape extending along the main axis Am. A plurality of compressor blade stages 13 arranged at intervals in a direction of the main axis Am are provided on the outer peripheral surface of the compressor rotor 11. Each of the compressor blade stages 13 has a plurality of compressor blades 14 arranged at intervals in a circumferential direction around the main axis Am on the outer peripheral surface of the compressor rotor 11.

The compressor casing 12 has a tubular shape centered on the main axis Am. A plurality of compressor vane stages 15 arranged at intervals in the direction of the main axis Am are provided on the inner peripheral surface of the compressor casing 12. The compressor vane stages 15 are arranged alternately with respect to the compressor blade stages 13 when viewed in the direction of the main axis Am. Each of the compressor vane stages 15 has a plurality of compressor vanes 16 arranged at intervals in the circumferential direction around the main axis Am on the inner peripheral surface of the compressor casing 12.

The combustor 3 is provided between the above-described compressor casing 12 and a turbine casing 22 (described later). The high-pressure air generated in the compressor 1 is mixed with fuel in the interior of the combustor 3 to become a premixed gas. The premixed gas burns in the combustor 3, whereby a high-temperature and high-pressure combustion gas is generated. The combustion gas is guided into the turbine casing 22 to drive the turbine 2.

The turbine 2 has a turbine rotor 21 which rotates around the main axis Am, and the turbine casing 22 which covers the turbine rotor 21 from the outer periphery side. The turbine rotor 21 has a columnar shape extending along the main axis Am. A plurality of turbine blade stages 23 arranged at intervals in the direction of the main axis Am are provided on the outer peripheral surface of the turbine rotor 21. Each of the turbine blade stages 23 has a plurality of turbine blades 24 arranged at intervals in the circumferential direction around the main axis Am on the outer peripheral surface of the turbine rotor 21. The turbine rotor 21 is integrally connected to the compressor rotor 11 in the direction of the main axis Am to form a gas turbine rotor 91.

The turbine casing 22 has a tubular shape centered on the main axis Am. A plurality of turbine vane stages 25 arranged at intervals in the direction of the main axis Am are provided on the inner peripheral surface of the turbine casing 22. The turbine vane stages 25 are arranged alternately with respect to the turbine blade stages 23 when viewed in the direction of the main axis Am. Each of the turbine vane stages 25 has a plurality of turbine vanes 26 arranged at intervals in the circumferential direction around the main axis Am on the inner peripheral surface of the turbine casing 22. The turbine casing 22 is connected to the compressor casing 12 in the direction of the main axis Am to form a gas turbine casing 92. That is, the gas turbine rotor 91 is integrally rotatable around the main axis Am in the gas turbine casing 92.

Figure 2:
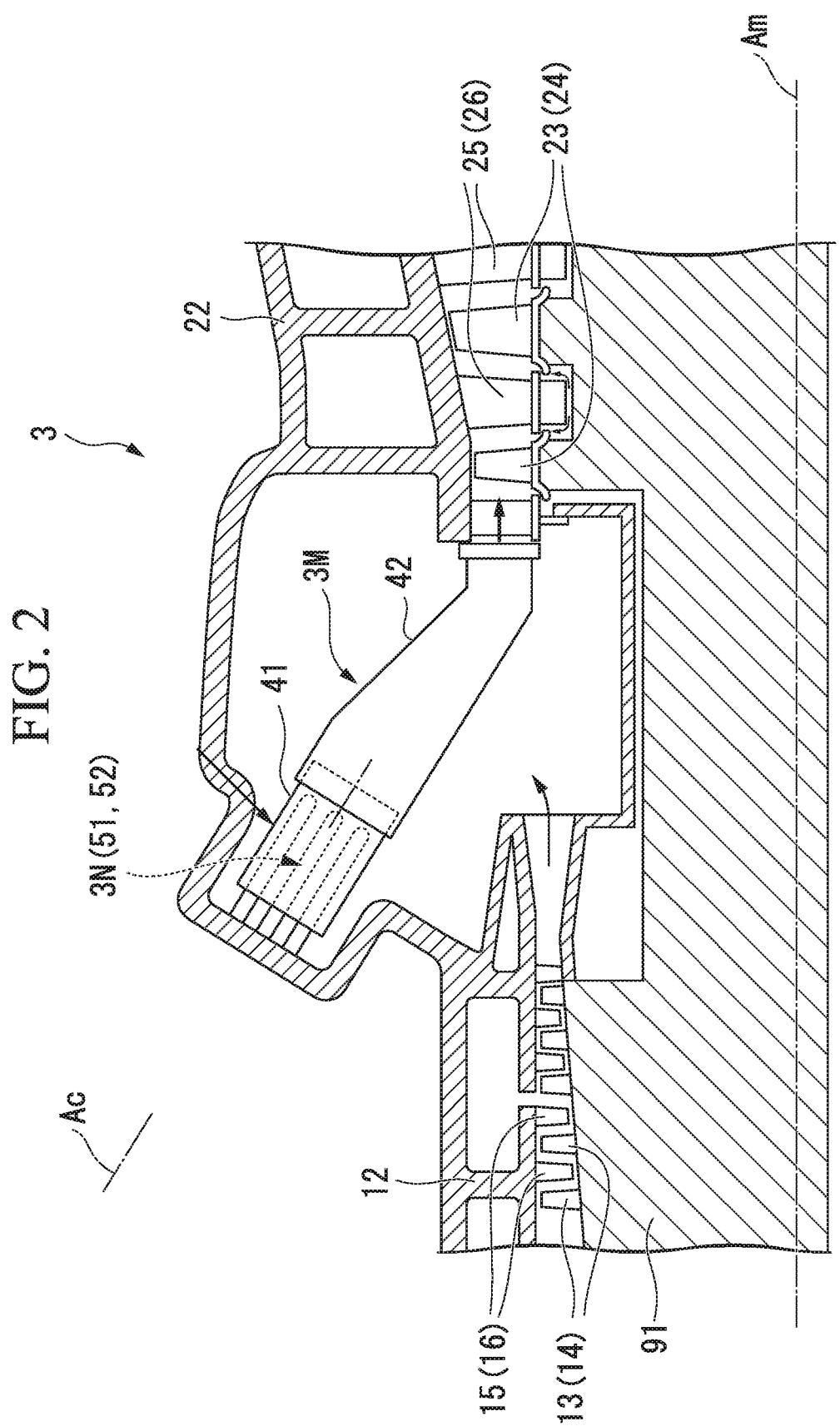
FIG. 2 is an enlarged view showing a configuration of a combustor according to the embodiment of the present invention.

Subsequently, a detailed configuration of the combustor 3 according to this embodiment will be described with reference to FIGS. 2 and 3. As shown in FIG. 2, the combustor 3 has a tubular combustor main body 3M centered on a combustor axis Ac (an axis), and a fuel nozzle 3N which supplies fuel to the combustor main body 3M. The combustor main body 3M has a first tubular body 41 which accommodates the fuel nozzle 3N, and a second tubular body 42 which is connected to the first tubular body 41 along the combustor axis Ac. In the following description, the side on which the first tubular body 41 is located, as viewed from the second tubular body 42 in a direction in which the combustor axis Ac extends, will be referred to as the upstream side, and the side on which the second tubular body 42 is located, as viewed from the first tubular body 41, will be referred to as the downstream side. That is, the combustion gas generated in the combustor 3 flows toward the downstream side from the upstream side.

The size of the outer diameter of the first tubular body 41 is set to be smaller than the size in the inner diameter of the second tubular body 42. In this way, a downstream-side end portion of the first tubular body 41 is in a state of being inserted into an upstream-side end portion of the second tubular body 42. The first tubular body 41 has a cylindrical shape centered on the combustor axis Ac. The second tubular body 42 gradually decreases in diameter toward the downstream side from the upstream side. The fuel nozzle 3N supplies fuel mainly toward the inside of the second tubular body 42 from the upstream side.

Figure 3:
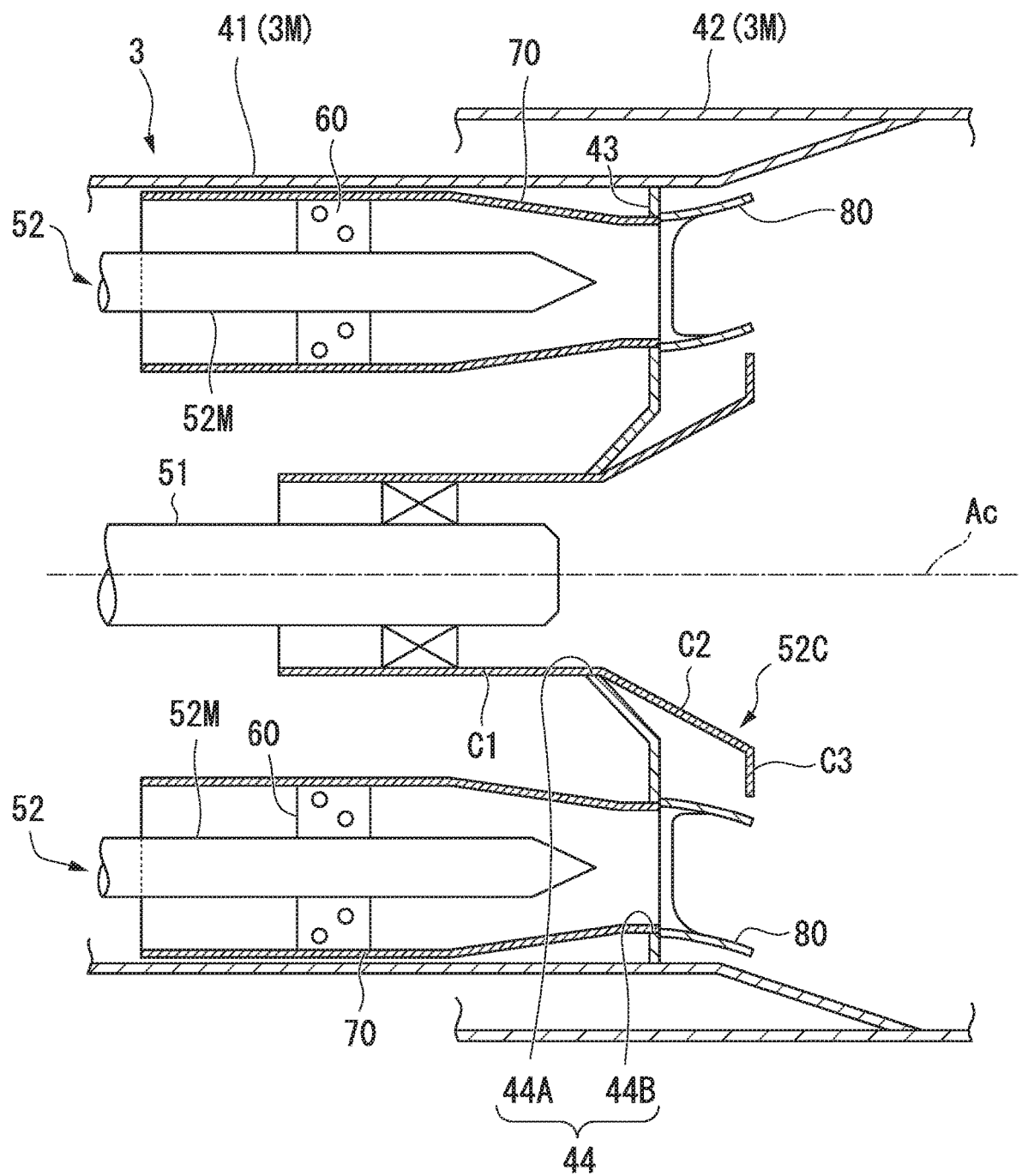
FIG. 3 is an enlarged sectional view of a main part of the combustor according to the embodiment of the present invention.

As shown in an enlarged manner in FIG. 3, a disk-shaped basal plate 43 centered on the combustor axis Ac is provided in an area close to the downstream-side end portion on the inner periphery side of the first tubular body 41. The size of a diameter of the basal plate 43 is set to be equal to or slightly smaller than the size of the inner diameter of the first tubular body 41. Nozzle support openings 44 (a first support opening 44A and a second support opening 44B) for supporting the fuel nozzle 3N in the first tubular body 41 are formed in the basal plate 43.

The fuel nozzle 3N includes a first nozzle 51 and a second nozzle 52. One first nozzle 51 is provided in the first tubular body 41 along the combustor axis Ac. The first nozzle 51 has a tubular shape centered on the combustor axis Ac, and a flow path (not shown) for guiding fuel is formed in the interior of the first nozzle 51. Further, an injection hole (not shown) for injecting the fuel guided through the flow path toward the inside of the first tubular body 41 is formed at a downstream-side end portion of the first nozzle 51.

A plurality of second nozzles 52 are provided at intervals in a circumferential direction around the combustor axis Ac. Each of the second nozzles 52 includes a second nozzle main body 52M extending parallel to the combustor axis Ac, a swirl vane 60 provided on the outer surface of the second nozzle main body 52M, and a nozzle cylinder 70 which covers the second nozzle main body 52M and the swirl vane 60 from the outer periphery side.

The second nozzle main body 52M is formed so as to be gradually tapered toward the downstream side from the upstream side. That is, a tip portion of the second nozzle main body 52M has a pointed shape. A flow path (not shown) through which fuel flows is formed in the interior of the second nozzle main body 52M. This flow path communicates with the outside through a plurality of injection holes formed in the vane surface of the swirl vane 60.

Further, a tubular extension tube 80 extending coaxially with the nozzle cylinder 70 is provided on the downstream side of each of the nozzle cylinders 70. A plurality of (eight) extension tubes 80 are arranged at intervals in the circumferential direction around the combustor axis Ac. Although not shown in detail, the cross-sectional shape of each of the extension tubes 80 is gradually deformed toward the downstream side from the upstream side so as to be changed from a circular shape to a rectangular shape. That is, an upstream-side end portion of the extension tube 80 has a circular cross section, while a downstream-side end portion of the extension tube 80 has a rectangular cross section. Further, the radially inner surface of each of the extension tubes 80 is curved outward from the inside in the radial direction as it goes from the upstream side toward the downstream side. In this way, the extension tube 80 and a flame stabilizer 52C (described later) do not interfere with each other.

The flame stabilizer 52C which covers the downstream-side end portion of the first nozzle 51 from the outer periphery side is provided at the downstream-side end portion of the first nozzle 51. The flame stabilizer 52C is provided for the purpose of stabilizing flame (diffusion flame) which is formed by the fuel injected from the first nozzle 51. More specifically, the flame stabilizer 52C according to this embodiment has a tubular portion C1 which covers the downstream-side end portion of the first nozzle 51 from the outer periphery side, and a cone portion C2 and a flange portion C3 provided on the downstream side of the tubular portion C1.

The tubular portion C1 has a cylindrical shape centered on the combustor axis Ac. The cone portion C2 and the flange portion C3 are integrally connected to the downstream-side end portion of the tubular portion C1. The cone portion C2 gradually expands in diameter toward the downstream side from the upstream side to form a conical shape. The flange portion C3 extends toward the outside in the radial direction of the combustor axis Ac from a downstream-side end edge (that is, the outermost peripheral portion) of the cone portion C2. The position of the flange portion C3 in the direction of the combustor axis Ac is the same as the position of the downstream-side end portion of the extension tube 80. Further, the tubular portion C1 is inserted into the first support opening 44A formed in the basal plate 43, thereby being supported from the outer periphery side.

Figure 5:
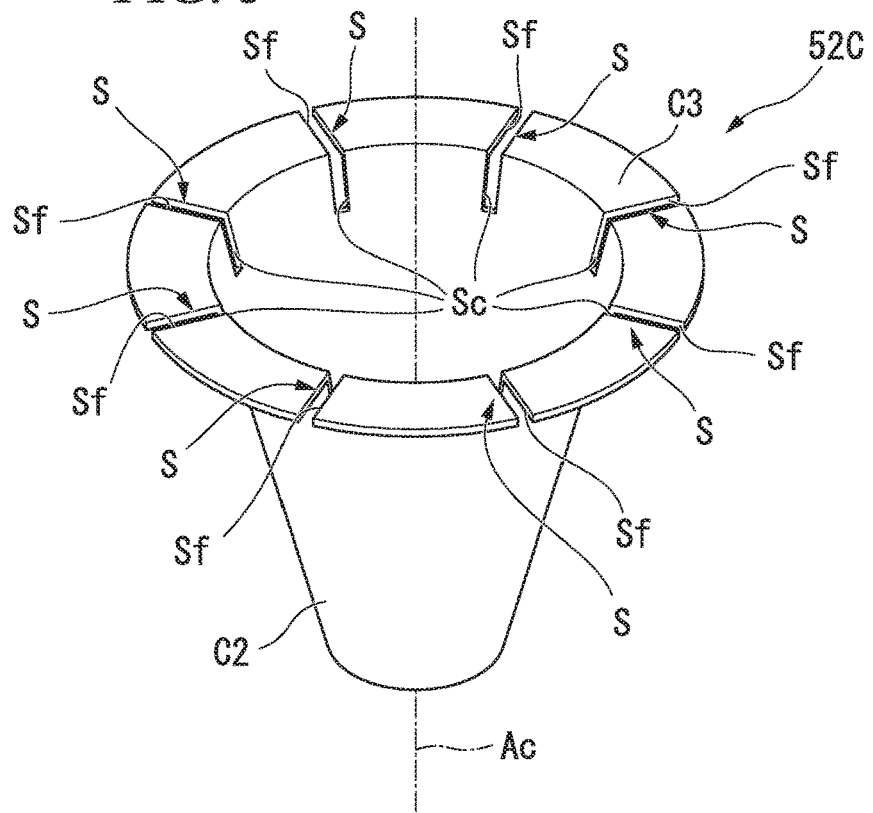
FIG. 5 is a view showing the combustor according to the embodiment of the present invention, as viewed in an axial direction (the downstream side).

Further, as shown in FIG. 5, a plurality of slits S (penetrating portions) are formed in the flame stabilizer 52C according to this embodiment. More specifically, the slits S are formed at equal intervals in the circumferential direction around the combustor axis Ac over the flange portion C3 and part of the cone portion C2. Each of the slits S is composed of a flange-portion slit Sf extending toward the outside from the inside in the radial direction of the flange portion C3, and a cone-portion slit Sc communicating with the flange-portion slit Sf and formed in a portion which includes the downstream-side end portion of the cone portion C2. The flange-portion slit Sf and the cone-portion slit Sc are obtained by forming cutouts extending in the radial direction in the flange portion C3 and the cone portion C2, respectively. The flange portion C3 is equally divided in the circumferential direction by the slits S. Further, a gap widened in the circumferential direction is formed between the end faces in the circumferential direction of the slit S.

Figure 4:
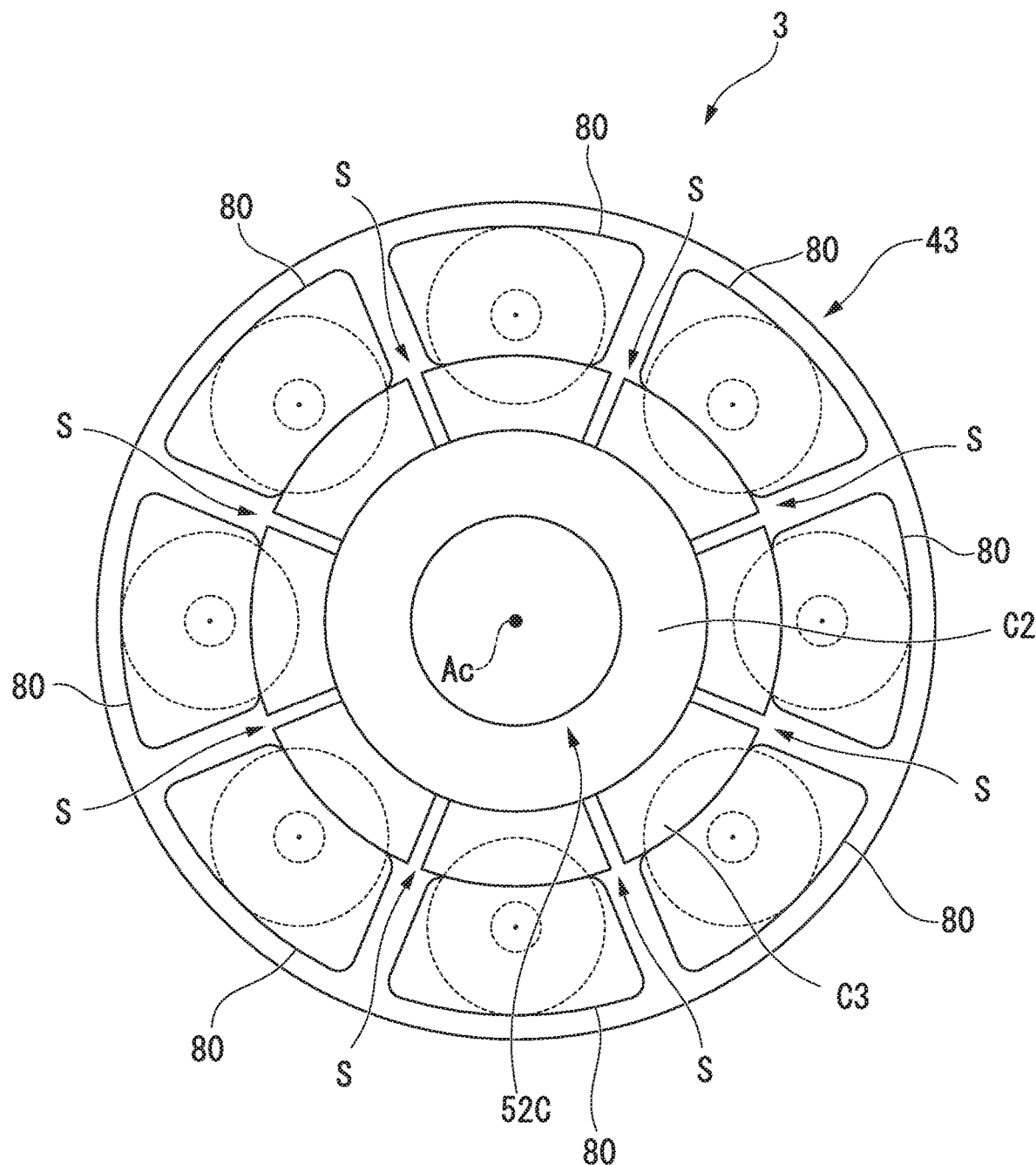
FIG. 4 is a perspective view showing a configuration of a flame stabilizer according to the embodiment of the present invention.

As shown in FIG. 4, the position in the circumferential direction of the slit S formed in the flame stabilizer 52C is between a pair of extension tubes 80 adjacent to each other. In other words, the position in the circumferential direction of the slit S is different from the position in the circumferential direction of the extension tube 80 itself, and the slit S and the extension tube 80 are disposed so as not to overlap each other in the circumferential direction. Furthermore, the size in the circumferential direction of the slit S is set to be sufficiently smaller than the size in circumferential direction between the extension tubes 80.

Subsequently, the operation of the gas turbine 100 and the combustor 3 according to this embodiment will be described. In the operation of the gas turbine 100, first, the compressor rotor 11 (the gas turbine rotor 91) is rotationally driven by an external drive source. External air is sequentially compressed with the rotation of the compressor rotor 11, whereby high-pressure air is generated. This high-pressure air is supplied to the interior of the combustor 3 through a space inside the compressor casing 12. In the combustor 3, the fuel supplied from the fuel nozzle 3N is mixed with the high-pressure air and burns, whereby a high-temperature and high-pressure combustion gas is generated. The combustion gas is supplied to the interior of the turbine 2 through a space inside the turbine casing 22. In the turbine 2, the combustion gas sequentially collides with the turbine blade stages 23 and the turbine vane stages 25, so that a rotational driving force is applied to the turbine rotor 21 (the gas turbine rotor 91). This rotational energy is used for the drive of a power generator or the like connected to a shaft end.

Next, the detailed operation of the combustor 3 will be described with reference to FIG. 3 again. As shown in the drawing, the high-pressure air generated in the compressor 1 is supplied to the interior of the first tubular body 41 from one side (the upstream side) of the combustor axis Ac. The high-pressure air introduced into the first tubular body 41 reaches the interior of the second tubular body 42 on the downstream side through the space on the inner periphery side of the nozzle cylinder 70. Here, in the nozzle cylinder 70, the fuel injected from the injection hole formed in the swirl vane 60 is mixed with the high-pressure air. In this way, in the nozzle cylinder 70, a premixed gas which includes the fuel and the high-pressure air is generated. At this time, a swirling flow component given by the swirl vane 60 is included in the flow of the premixed gas.

On the other hand, the fuel injected from the first nozzle 51 is ignited by an igniter (not shown), thereby forming diffusion flame (or premixed flame) extending toward the downstream side from the first nozzle 51. This flame propagates to the premixed gas which is present in the nozzle cylinder 70, whereby premixed flame is formed on the downstream side of the plurality of second nozzles 52. This premixed flame extends toward the downstream side from the upstream side in the second tubular body 42 with the swirling flow component and generates a high-temperature and high-pressure combustion gas. The combustion gas flows toward the downstream side from the upstream side in the second tubular body 42 and is then introduced into the turbine casing 22 to drive the turbine 2.

The premixed flame which is formed by the second nozzle 52 is stabilized by the flame stabilizer 52C disposed close to the second nozzle 52. Specifically, it is desirable that the shape of the premixed flame or the flow velocity distribution of the combustion gas is uniformly maintained over the whole area in the circumferential direction by the flame stabilizer 52C. Here, heat due to the flame propagates to the flame stabilizer 52C. Due to this heat, there is a case where thermal stress is applied to the flame stabilizer 52C. In a case where excessive thermal deformation occurs in the flame stabilizer 52C due to the thermal stress, there is a concern that the shape of the flame or the flow velocity distribution of the combustion gas as described above may be disturbed. Such disturbance affects the stable operation of the combustor 3.

Therefore, in this embodiment, as described above, the plurality of slits S are formed in the flame stabilizer 52C. In particular, the flange-portion slit Sf is formed in the flange portion C3 of the flame stabilizer 52C, and therefore, even in a case where the flame stabilizer 52C is exposed to the heat of the flame, thermal stress in a peripheral portion of the flange-portion slit Sf can be released. That is, it is possible to reduce a possibility that thermal deformation may occur in the cone portion C2 formed integrally with the flange portion C3. Further, in other words, compared to a configuration in which the slit S is not formed, an area where thermal deformation occurs is limited only to the periphery of the flange portion C3 and the area thereof can be reduced.

Further, in the above configuration, the cone-portion slit Sc communicating with the flange-portion slit Sf is formed in the cone portion C2. In this way, in a case where the flame stabilizer 52C is exposed to heat, thermal stress is absorbed by the cone-portion slit Sc as well. As a result, it is possible to suppress thermal deformation in a connection portion between the flange portion C3 and the cone portion C2 (an end edge on the outside in the radial direction of the cone portion C2). In this way, the durability of the flame stabilizer 52C can be improved. On the contrary, in a case where only the flange-portion slit Sf is formed, stress concentrates on the connection portion, and therefore, there is a concern that fatigue fracture or the like may occur.

In addition, in the above configuration, the plurality of slits S are provided in the flame stabilizer 52C at intervals in the circumferential direction around the combustor axis Ac. In this way, even in a case where the flame stabilizer 52C is exposed to heat, it is possible to make the thermal stress which is applied to the flame stabilizer 52C uniform in the circumferential direction. In this way, it is possible to reduce a possibility that the flame stabilizer 52C may be unevenly deformed in the circumferential direction. Therefore, it is possible to reduce a possibility that the shape of the flame may be affected by thermal deformation occurring in the flame stabilizer 52C.

Further, in the combustor 3 described above, the position in the circumferential direction of the slit S in the flange portion C3 is between the extension tubes 80. Here, the flame formed on the downstream side of the second nozzle 52 extends toward the downstream side within each extension tube 80. On the other hand, air guided from the outside of the combustor 3 flows toward the downstream side from the upstream side of the flame stabilizer 52C. In a case where the position in the circumferential direction of the slit S formed in the flame stabilizer 52C overlaps the position in the circumferential direction of each extension tube 80, air passing through the slit S is supplied to the flame which is formed on the downstream side of each extension tube 80, and therefore, the composition of an air-fuel mixture which is supplied to the flame changes, so that there is a possibility that combustibility may be affected.

However, in the above configuration, the position in the circumferential direction of the slit S in the flange portion C3 is between the extension tubes 80. In other words, the slit S is formed at a position different from each extension tube 80 in the circumferential direction. Further, air flows from the upstream side into the space between the extension tubes 80. In this way, it is possible to reduce a possibility that the air passing through the slit S may affect the combustibility. Therefore, it becomes possible to more stably operate the combustor 3.

The embodiment of the present invention has been described above. It is possible to apply various modifications to the above configuration without departing from the gist of the present invention. For example, in the above embodiment, an example in which as a penetrating portion, the slit S is formed in the flame stabilizer 52C has been described. However, the aspect of the penetrating portion is not limited to the slit S.

Figure 6:
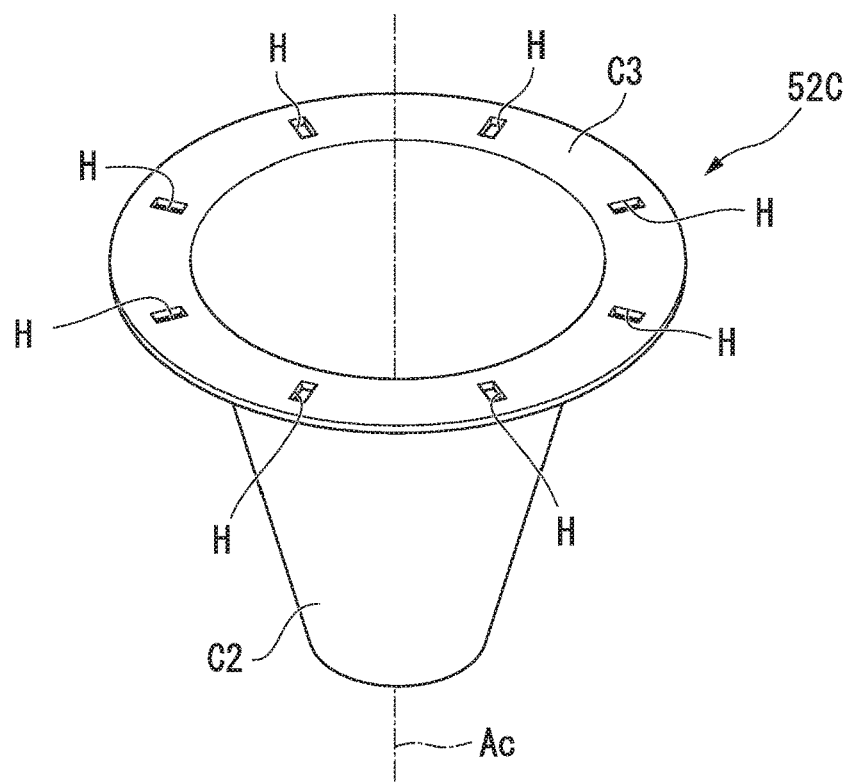
FIG. 6 is a diagram showing a modification example of the flame stabilizer according to the embodiment of the present invention.

As another example (a modification example), as shown in FIG. 6, a configuration is also conceivable in which a plurality of holes H penetrating the flange portion C3 in the direction of the combustor axis line Ac are formed in the flange portion C3. Specifically, each of the holes H has a rectangular opening shape when viewed in the direction of the combustor axis Ac. Further, the holes H are arranged at equal intervals in the circumferential direction on the flange portion C3. Also with this configuration, similar to the above embodiment, thermal stress around the hole H can be released, and therefore, it is possible to reduce a possibility that distortion may occur in the entire flame stabilizer 52C.

The slit S and the hole H described above can also be formed in the same flame stabilizer 52C. For example, it is also possible to alternately arrange the slit S and the hole H in the circumferential direction of the flame stabilizer 52C.

Figure 7:
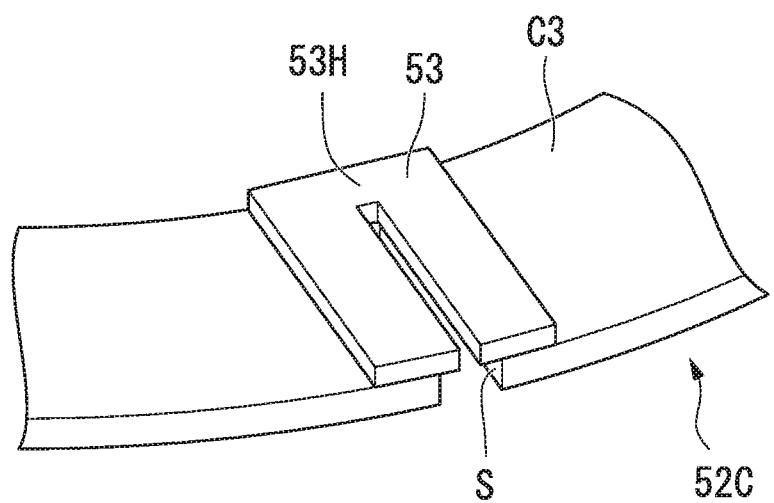
FIG. 7 is a diagram showing another modification example of the flame stabilizer according to the embodiment of the present invention.

As still another example, as shown in FIG. 7, it is also possible to provide a plate-shaped adjustment plate 53 covering the slit S (or the hole H) from the downstream side, in the flame stabilizer 52C. An adjusting penetration portion 53H having an opening area smaller than the opening area of the slit S is formed in the adjustment plate 53. More specifically, the adjusting penetration portion 53H has a cutout shape that is recessed toward the inside in the radial direction from an end edge on the outer periphery side of the adjustment plate 53. Further, the adjusting penetration portion 53H and the slit S communicate with each other. According to such a configuration, it is possible to release thermal stress by the slit S, and in addition, it is possible to adjust the amount of air passing through the slit S by the adjusting penetration portion 53H of the adjustment plate 53. In this way, it is possible to further reduce a possibility that air passing through the slit S may affect the combustibility.

INDUSTRIAL APPLICABILITY

According to the present invention, it is possible to provide a combustor which can stably operate even in a case where thermal deformation occurs in a flame stabilizer, and a gas turbine which is provided with the combustor.

REFERENCE SIGNS LIST

1: compressor
2: turbine
3: combustor
3M: combustor main body
3N: fuel nozzle
11: compressor rotor
12: compressor casing
13: compressor blade stage
14: compressor blade
15: compressor vane stage
16: compressor vane
21: turbine rotor
22: turbine casing
23: turbine blade stage
24: turbine blade
25: turbine vane stage
26: turbine vane
41: first tubular body
42: second tubular body
43: basal plate
44: nozzle support opening
44A: first support opening
44B: second support opening
51: first nozzle
52: second nozzle
52C: flame stabilizer
52M: second nozzle main body
60: swirl vane
70: nozzle cylinder
80: extension tube
91: gas turbine rotor
92: gas turbine casing
100 gas turbine
Ac: combustor axis
Am: main axis
C1: tubular portion
C2: cone portion
C3: flange portion
H: hole
S: slit
Sc: cone-portion slit
Sf: flange-portion slit

The invention claimed is:

1. A combustor comprising:
a first nozzle which extends along an axis and injects fuel toward a downstream side;
a flame stabilizer which covers a downstream-side end portion of the first nozzle from an outer periphery side; and
a plurality of second nozzles arranged at first intervals in a circumferential direction around the axis on the outer periphery side of the flame stabilizer,
wherein the flame stabilizer has a cone portion expanding in diameter toward the downstream side from the upstream side, and a flange portion extending radially outward from a downstream-side end edge of the cone portion,
wherein a penetrating portion which penetrates the flange portion in an axial direction is formed in at least the flange portion,
wherein the combustor further comprises:
an adjustment plate which covers the penetrating portion from the downstream side, and
wherein an adjusting penetration portion having an opening area smaller than an opening area of the penetrating portion and communicating with the penetrating portion is formed in the adjustment plate.

2. The combustor according to claim 1, further comprising:
a plurality of extension tubes each provided on the downstream side of each of the second nozzles and having a tubular shape extending in the axial direction, and arranged at the first intervals in the circumferential direction around the axis,
wherein a position in the circumferential direction where the penetrating portion is provided on the flange portion is between a pair of extension tubes adjacent to each other.

3. The combustor according to claim 1,
wherein the penetrating portion includes:
a flange-portion slit extending toward the inside from the outside in the radial direction of the flange portion, and a cone-portion slit communicating with the flange-portion slit and formed in an area which includes the downstream-side end portion of the cone portion.

4. The combustor according to claim 1,
wherein the penetrating portion is a hole which penetrates the flange portion in the axial direction.

5. The combustor according to claim 1,
wherein a plurality of penetrating portions including the penetrating portion are formed at second intervals in the circumferential direction around the axis in at least the flange portion.

6. A gas turbine comprising:
a compressor which generates high-pressure air;
the combustor according to claim 1, which generates a combustion gas by mixing the high-pressure air and the fuel and burning the mixture; and
a turbine which is driven by the combustion gas.

\* \* \* \* \*